United States Patent
Madge

(10) Patent No.: US 8,099,255 B2
(45) Date of Patent: Jan. 17, 2012

(54) SYSTEM AND METHOD FOR MEASURING SHAFT DEFLECTION IN A WIND TURBINE

(75) Inventor: James Henry Madge, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/970,078

(22) Filed: Dec. 16, 2010

(65) Prior Publication Data

US 2011/0246131 A1    Oct. 6, 2011

(51) Int. Cl.
*G06F 15/00* (2006.01)
*B63H 3/00* (2006.01)

(52) U.S. Cl. .......................... 702/150; 416/61
(58) Field of Classification Search .............. 702/150; 73/660, 862.457; 416/61, 43
See application file for complete search history.

(56) References Cited

U.S. PATENT DOCUMENTS

| 6,361,275 | B1 | 3/2002 | Wobben |
| 6,619,918 | B1 | 9/2003 | Rebsdorf |
| 7,004,724 | B2 | 2/2006 | Pierce et al. |
| 7,160,083 | B2 | 1/2007 | Pierce et al. |
| 2004/0151575 | A1* | 8/2004 | Pierce et al. ............. 415/1 |
| 2011/0140431 | A1* | 6/2011 | Landa et al. ............. 290/44 |

* cited by examiner

*Primary Examiner* — Bryan Bui
(74) *Attorney, Agent, or Firm* — Dority & Manning, P.A.

(57) ABSTRACT

A measurement system and a method for measuring a net deflection of a shaft in a wind turbine are disclosed. The measurement system includes at least one first sensor positioned proximate a first shaft component, the at least one first sensor configured to measure at least one first deflection of the first shaft component, and at least one second sensor configured to measure at least one reference deflection. The measurement system further includes a base, wherein the at least one first sensor and the at least one second sensor are coupled together and configured on the base, and a processor configured to calculate the net deflection of the shaft utilizing the at least one first deflection and the at least one reference deflection.

18 Claims, 4 Drawing Sheets

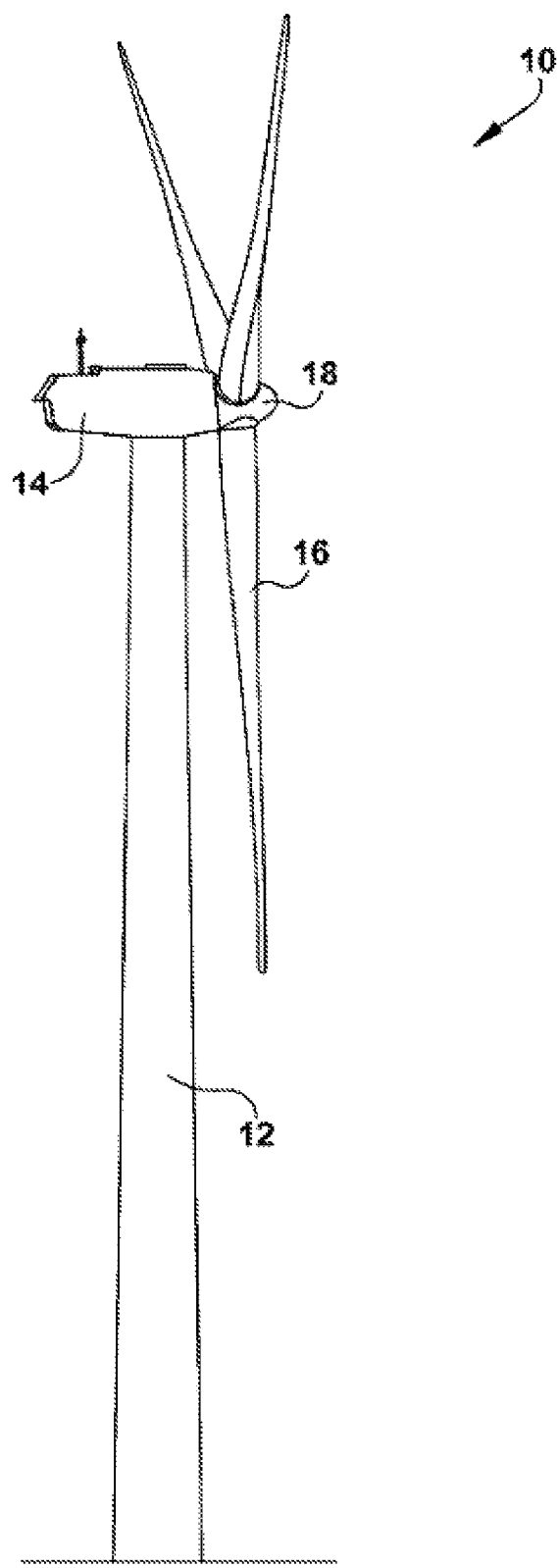
FIG. −1−

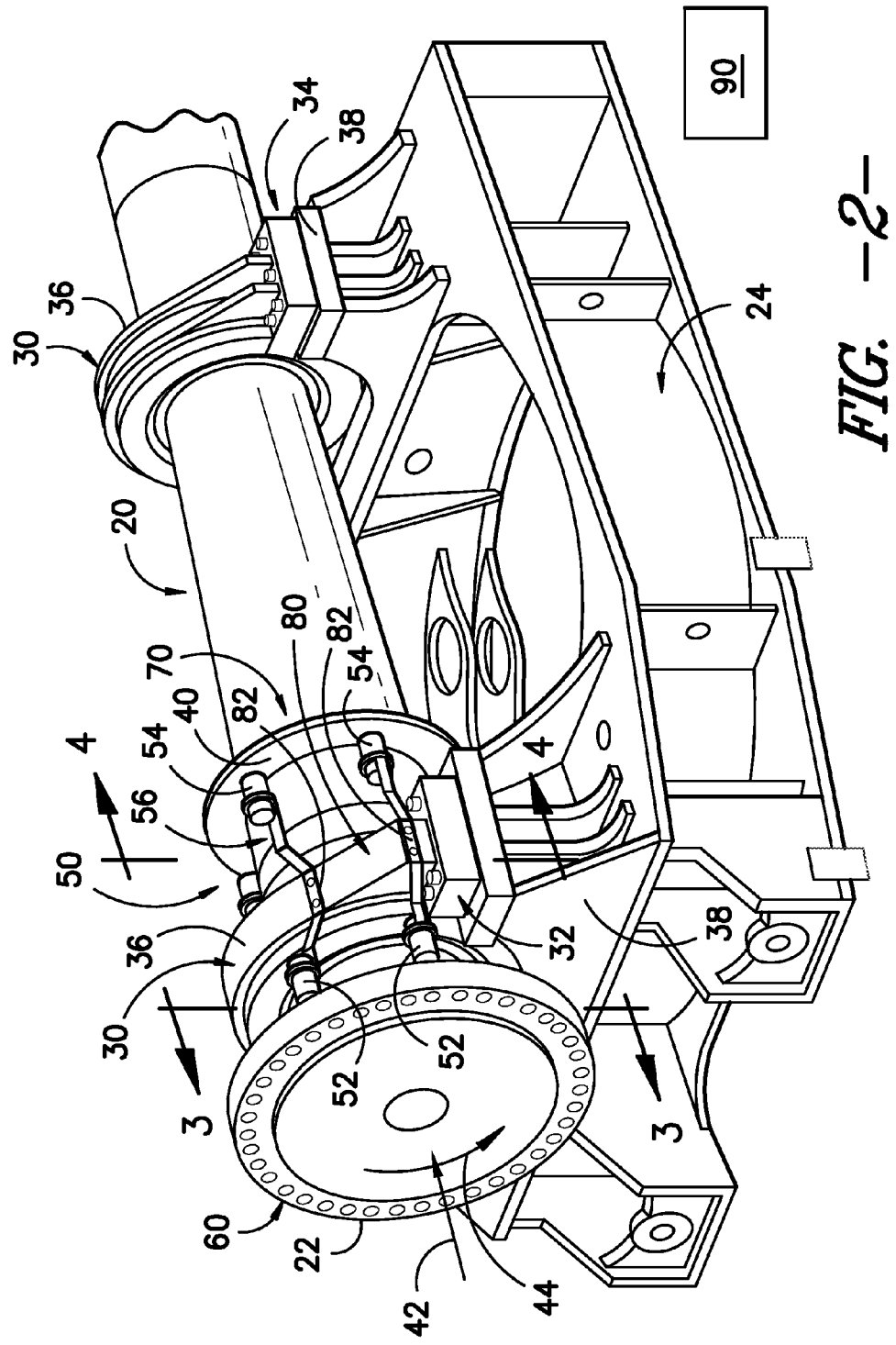
FIG. -2-

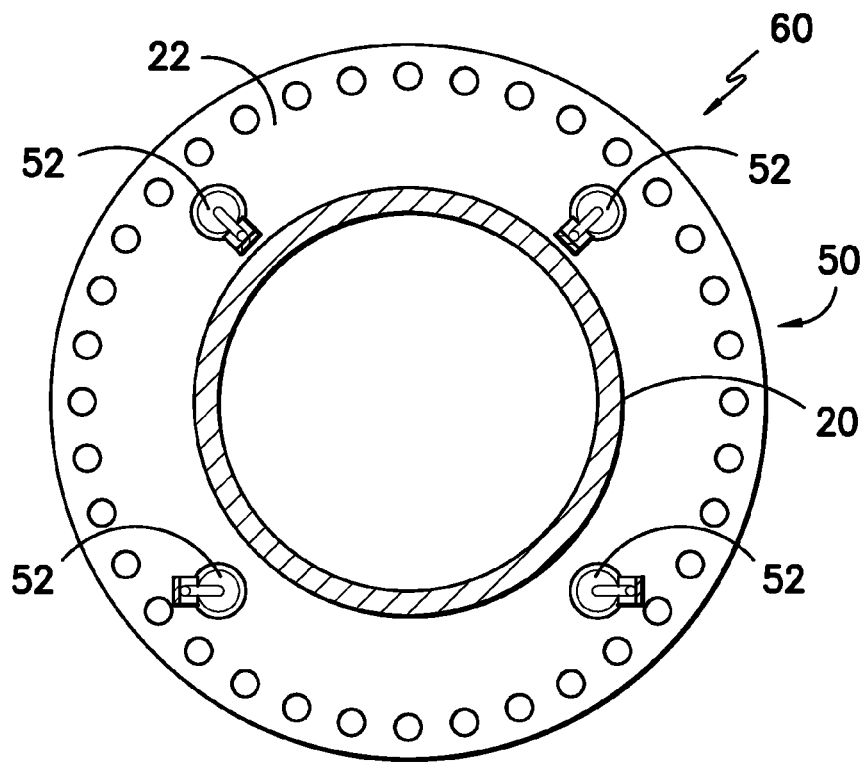
FIG. -3-
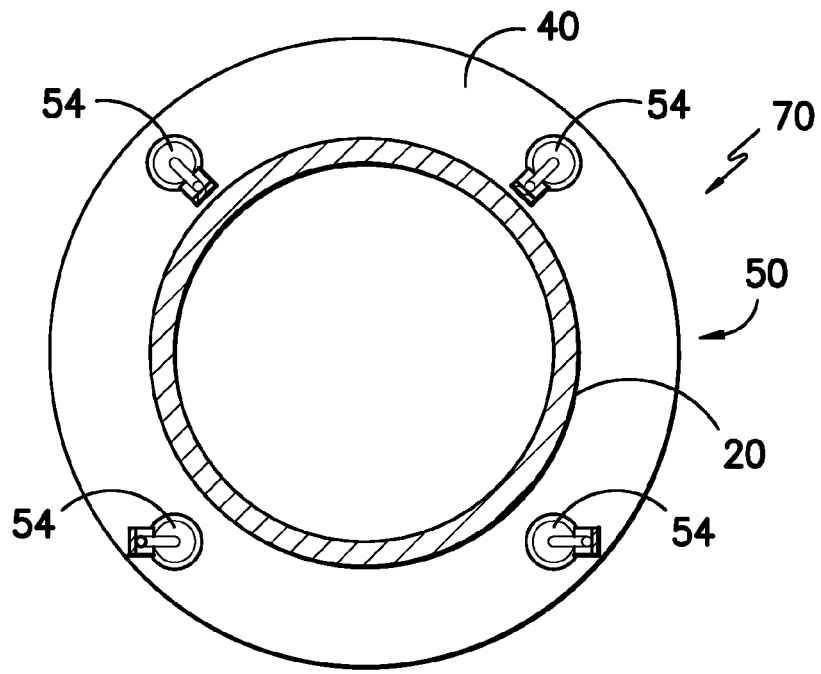
FIG. -4-

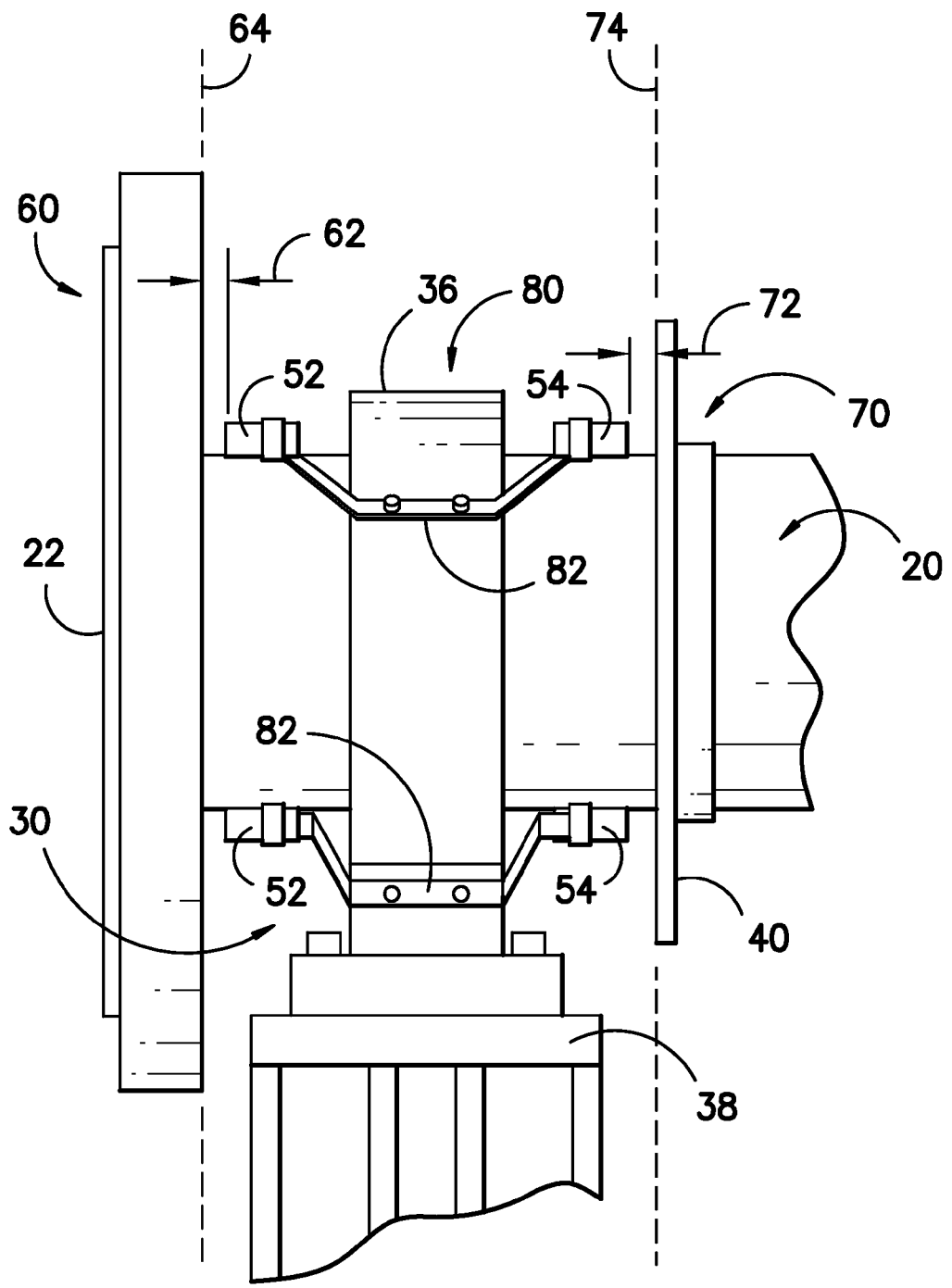
FIG. -5-

SYSTEM AND METHOD FOR MEASURING SHAFT DEFLECTION IN A WIND TURBINE

FIELD OF THE INVENTION

The subject matter disclosed herein relates generally to wind turbines, and more particularly to systems and methods for measuring the deflection of shafts in wind turbines.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

During operation of a wind turbine, various components of the wind turbine are subjected to various loads. In particular, the shaft coupling the rotor blades and the generator may be subjected to various loads, such as axial and bending loads. Deflection of the shaft due to these loads may thus frequently occur during operation of the wind turbine.

In many cases, the deflection of the shaft may be measured and utilized to adjust other variables in the wind turbine, such as the pitch axis of the rotor blades. However, currently known systems and methods for measuring shaft deflection may not be accurate, any may thus provide inaccurate data for adjusting the other variables in the wind turbines. For example, currently known systems and methods may measure the deflection of one component of the shaft, such as the hub flange of the shaft. The sensors utilized to measure this deflection may be mounted to a base, such as to the pillow block assembly that is housing the shaft and support bearing for the shaft. However, during operation of the wind turbine, the base may also be subjected to various loads and deflections, along with the deflection of shaft. The sensors mounted to the base may thus receive inaccurate shaft deflection data due to the deflection of the base.

Thus, an improved system and method for measuring the deflection of a shaft in a wind turbine is desired. For example, a system and method that provide more accurate shaft deflection measurements would be advantageous. In particular, a system and method that reduce or eliminate extraneous deflection data due to the deflection of other components of the wind turbine would be desired.

BRIEF DESCRIPTION OF THE INVENTION

Aspects and advantages of the invention will be set forth in part in the following description, or may be obvious from the description, or may be learned through practice of the invention.

In one embodiment, a measurement system for measuring a net deflection of a shaft in a wind turbine is disclosed. The measurement system includes at least one first sensor positioned proximate a first shaft component, the at least one first sensor configured to measure at least one first deflection of the first shaft component, and at least one second sensor configured to measure at least one reference deflection. The measurement system further includes a base, wherein the at least one first sensor and the at least one second sensor are coupled together and configured on the base, and a processor configured to calculate the net deflection of the shaft utilizing the at least one first deflection and the at least one reference deflection.

In another embodiment, a method for measuring a net deflection of a shaft in a wind turbine is disclosed. The method includes measuring at least one first deflection of a first shaft component, measuring at least one reference deflection, and calculating the net deflection of the shaft utilizing the at least one first deflection and the at least one reference deflection. The shaft is configured on a base, and the at least one first deflection and the at least one reference deflection are both measured relative to the base.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of a wind turbine according to one embodiment of the present disclosure;

FIG. 2 is a perspective view of a measurement system according to one embodiment of the present disclosure;

FIG. 3 is a cross-sectional view of a measurement system, along the lines 3-3 of FIG. 2, according to one embodiment of the present disclosure;

FIG. 4 is a cross-sectional view of a measurement system, along the lines 4-4 of FIG. 2, according to one embodiment of the present disclosure; and, FIG. 5 is a side view of a sensor couple according to one embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft, as discussed below. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

FIG. 2 illustrates one embodiment of a shaft 20 according to the present disclosure. The shaft 20 includes a hub flange 22 for mounting the hub thereon. The shaft 20 further extends into the nacelle 14 and is operably connected to a generator (not shown). The shaft 20 in some embodiments may be a direct-drive shaft 20. In these embodiments, the shaft 20 is directly connected to the generator. Alternatively, a gearbox (not shown) may be disposed between the shaft 20 and the generator, and may provide the operable connection between the shaft 20 and the generator. Rotation of the rotor blades 16 is transmitted through the hub 18 to the shaft 20, and from the shaft 20 to the generator.

A bed plate 24 may be provided to support the shaft 20, as shown. In general, the bed plate 24 is a frame disposed in the nacelle 14. The bed plate 24 may, in some embodiments, further provide support for other components of the wind turbine 10, such as the generator and/or, if present, the gearbox.

As shown in FIG. 2, the bed plate 24 according to the present disclosure may include a pillow block assembly 30, or a plurality of pillow blocks assemblies 30, thereon for accommodating and supporting the shaft 20. In one embodiment as shown in FIG. 2, the bed plate 24 includes a forward pillow block assembly 32 and an aft pillow block assembly 34. The forward pillow block assembly 32 is the pillow block assembly adjacent the hub 18, and the aft pillow block assembly 34 is the pillow block assembly distal from the hub 18. It should be understood, however, that the present disclosure is not limited to a forward pillow block assembly 32 and an aft pillow block assembly 34. Rather, any number or form of pillow blocks assemblies 30 is within the scope and spirit of the present disclosure.

Each of the pillow block assemblies 30 may include, for example, a pillow block 36 and, optionally, a pedestal 38. The pillow block 36 may accept the shaft 20 therein and interact with the shaft 20. For example, the pillow block 36 may include a bearing, such as a locating bearing or a floating bearing, therein for supporting the shaft 20. The pedestal 38 may support the pillow block 36 and align the pillow block 36 with the shaft 20.

In exemplary embodiments, a disc 40 may be mounted to shaft 20. The disc 40 may, for example, be positioned on the shaft 20 between the forward pillow block assembly 32 and the aft pillow block assembly 34, or at another other suitable position on the shaft 20. The disc 40 may be formed integrally with the shaft, or may be mounted to the shaft 20 through any suitable mechanical fasteners, such as nuts and bolts, rivets, screws, or nails, or any suitable bonding technique, such as welding, or any other suitable fastening method or device. In some embodiments, the disc 40 may be formed as two or more disc 40 components, which may be placed around the shaft and fastened together and to the shaft. In these embodiments, for example, the disc 40 may be retrofitted to the shaft 20.

During operation of the wind turbine 10, the shaft 20 may be subjected to various loads, such as axial loads 42 and bending loads 44, as shown in FIG. 2. Various of these loads may cause deflection of the shaft 20. This deflection must be accurately measured to, for example, allow it to be accurately utilized to adjust other components of the wind turbine 10, thus ensuring better performance of the wind turbine.

Thus, as shown in FIGS. 2 through 5, a measurement system 50 for measuring a net deflection of a shaft 20 in a wind turbine 10 is disclosed. The measurement system 50 may provide more accurate shaft 20 deflection measurements, and may reduce or eliminate extraneous deflection data due to the deflection of other components of the wind turbine 10.

For example, the measurement system 50 includes at least one first sensor 52 and at least one second sensor 54, or a plurality of first sensors 52 and a plurality of second sensors 54. Each of the second sensors 54 is coupled to a first sensor 52 to form a sensor couple 56. In exemplary embodiments, three or four sensor couples 56 may be provided. Alternatively, however, any suitable number of sensor couples, including one, two, or five or more sensor couples 56, may be provided.

In exemplary embodiments, the first sensors 52 and the second sensors 54, or at least a portion thereof, may be proximity sensors. Alternatively, however, the first sensors 52 and the second sensors 54, or at least a portion thereof, may be, for example, strain gauges, or any other suitable devices for measuring the deflection of shaft components as discussed below.

Each of the first sensors 52 may be positioned proximate a first shaft component 60. The first shaft component 60 may be any suitable component of the shaft 20, such as any component that deflects during operation of the wind turbine 10. For example, in exemplary embodiments, the first shaft component 60 may be the hub flange 22. The first sensors 52 may be configured to measure a first deflection of the first shaft component 60. A first deflection may, in general, be defined as the change in distance 62 (see FIG. 5) between a first sensor 52 and the first shaft component 60. Thus, to measure the first deflection of the first shaft component 60, the first sensors 52 may measure the change in distance 62 between the first sensor 52 and the first shaft component 60. Further, in some embodiments, the first shaft component 60 may define a first plane 64 (see FIG. 5). Each of the first sensors 52 may be configured to measure the first deflection with respect to the first plane 64. Thus, to measure the first deflection of the first shaft component 60, the first sensors 52 may measure the change in distance 62 between the first sensor 52 and the first plane 64.

As shown in FIG. 3, the first sensors 52 may be circumferentially spaced about the shaft 20. For example, in some embodiments, the first sensors 52 may be approximately equally spaced apart circumferentially about the shaft 20. In embodiments wherein the measurement system 50 includes three first sensors 52, the three first sensors 52 may each be positioned approximately 120 degrees apart. In embodiments wherein the measurement system 50 includes four first sensors 52, the four first sensors 52 may each be positioned approximately 90 degrees apart.

Each of the second sensors 54 may be configured to measure a reference deflection. The reference deflections measured by the second sensors 54 may generally be reference deflections of other components of the shaft 20 during deflection of the first shaft component 60. The reference deflections may be utilized with the first deflections to provide more accurate shaft 20 deflection measurements, and may reduce or eliminate extraneous deflection data due to the deflection of other components of the wind turbine 10. For example, in exemplary embodiments, each of the second sensors 54 may be positioned proximate a second shaft component 70. The second shaft component 70 may be any suitable component of the shaft 20, such as any component that deflects during operation of the wind turbine 10. In exemplary embodiments, the second shaft component 70 may be the disc 40. Each of the second sensors 54 may be configured to measure a second deflection of the second shaft component 70, which may serve as the reference deflections. A second deflection may, in general, be defined as the change in distance 72 (see FIG. 5) between a second sensor 54 and the second shaft component 70. Thus, to measure the second deflection of the second shaft component 70, the second sensors 54 may measure the change in distance 72 between the second sensor 54 and the second shaft component 70. Further, in some embodiments, the second shaft component 70 may define a second plane 74 (see FIG. 5). Each of the second sensors 54 may be configured to measure the second deflection with respect to the second plane 74. Thus, to measure the second deflection of the second shaft component 70, the second sensors 54 may measure the change in distance 72 between the second sensor 54 and the second plane 74.

As shown in FIG. 4, the second sensors 54 may be circumferentially spaced about the shaft 20. For example, in some embodiments, the second sensors 54 may be approximately equally spaced apart circumferentially about the shaft 20. In embodiments wherein the measurement system 50 includes three second sensors 54, the three second sensors 54 may each be positioned approximately 120 degrees apart. In embodiments wherein the measurement system 50 includes four second sensors 54, the four second sensors 54 may each be positioned approximately 90 degrees apart.

Further, as shown in FIGS. 2 through 5, in some embodiments, each first sensor 52 and second sensor 54 of each sensor couple 56 may be positioned substantially circumferentially identically with respect to the shaft 20. Thus, both the first sensor 52 and second sensor 54 of each sensor couple 56 may be positioned to measure deflection from substantially circumferentially identical points on the first shaft component 60 and second shaft component 70.

As shown in FIGS. 2 and 5, the measurement system 50 according to the present disclosure may further include a base 80. In general, the shaft 20 may be configured on the base 80. For example, in exemplary embodiments, the base 80 may be a pillow block assembly 30, or any component thereof such as the pillow block 36 or the pedestal 38. Alternatively, the base 80 may be a bed plate 24, or any other suitable component of the wind turbine 10. The base 80 may generally be configured for mounting the first sensors 52 and second sensors 54 thereon such that they can measure the deflection of the first shaft component 60 and the second shaft component 70.

Thus, as discussed above, the first sensors 52 and second sensors 54 may be coupled together, forming sensor couples 56. Each sensor couple 56 may be configured on the base 80. For example, in some embodiments, the first sensors 52 and second sensors 54 may be mounted directly to the base 80. In other embodiments, a linkage 82 or a plurality of linkages 82 may be provided to mount the first sensors 52 and second sensors 54 to the base 80. For example, in exemplary embodiments, a linkage 82 may link each sensor couple 56 together, and may mount the sensor couple to the base 80. The first and second sensors 52 and 54 and/or the linkages 82 may be mounted to the base 80 through any suitable mechanical fasteners, such as nuts and bolts, rivets, screws, or nails, or any suitable bonding technique, such as welding, or any other suitable fastening method or device.

It should be understood that each sensor couple 56 may be configured on the same base 80 as the other sensor couples, or may be configured on a different base from other sensor couples 56. For example, some sensor couples 56 may be configured on the pillow block 36, while others are configured on the pedestal 38 and/or the bed plate 24, or all sensor couples 56 may be configured on the pillow block assembly 30, which comprises the pillow block 36 and the pedestal 38, or on the pillow block 36, the pedestal 38, or the bed plate 24.

Advantageously, the utilization of the base 80 for mounting both the first sensors 52 and the second sensors 54 thereon may allow for more accurate measurement of the net deflection of the shaft 20. For example, each of the first sensor 52 and second sensor 54 of each sensor couple 56 may measure the first deflection and second deflection of the respective first and second shaft components 60 and 70 relative to the base 80. Thus, if the base 80 is also subject to deflection during operation of the wind turbine 10, this extraneous deflection can be eliminated from the deflection measurements of each sensor couple 56. For example, the second deflection of the second shaft component 70, measured by the second sensor 54, and the first deflection of the first shaft component 60, measured by the first sensor 52, may be utilized to calculate the net deflection of the shaft 20. The net deflection of the shaft 20, in general, is the approximate actual deflection of the shaft 20, with the deflection of other components such as the base 80 eliminated or reduced from the measurement of this deflection. To calculate the net deflection, the reference deflection, such as the second deflection, may be subtracted from the first deflection or vice-versa, or the reference deflection may be utilized in a transfer function or other suitable equation with the first deflection, or the reference deflection may be otherwise suitably utilized to manipulate the first deflection or vice-versa and output the net deflection.

Additionally, the first deflection and reference deflection measured by each sensor couple 56 may be utilized with the first deflections and reference deflections measured by other sensor couples 56 to calculate the net deflection of the shaft 20. For example, to calculate the net deflection, the reference deflections may be subtracted from the first deflections or vice-versa, or the reference deflections may be utilized in a transfer function or other suitable equation with the first deflections, or the reference deflections may be otherwise suitably utilized to manipulate the first deflections or vice-versa and output the net deflection. In some embodiments, the net deflection may be calculated utilizing all of the first and reference deflections in one equation. Alternatively, a net deflection may be calculated based on the first and reference deflections for each sensor couple 56, and these net deflections may be averaged or otherwise suitably manipulated to calculate the net deflection of the shaft 20.

The measurement system 50 of the present disclosure may further include a processor 90. As used herein, the term "processor" is not limited to integrated circuits referred to in the art as a computer, but broadly refers to a controller, a microcontroller, a computer, a microcomputer, a programmable logic controller (PLC), an application specific integrated circuit, and/or any other suitable programmable devices or circuits. It should be understood that a processor can include memory, input channels, and/or output channels. It should further be understood that a processor may include multiple of the above disclosed devices and/or circuits, and that these devices and/or circuits may be linked together through any suitable wired or wireless connection.

Each of the first sensors 52 and second sensors 54 may be communicatively coupled to the processor 90 through, for example, a wired or wireless connection. The processor 90 may be configured to calculate the net deflection of the shaft 20 utilizing the first deflections and the reference deflections, such as the second deflections, as discussed above. For example, the processor 90 may include a program or programs therein configured to calculate the net deflection utilizing the first deflections and the reference deflections. Calculation of the net deflection may be performed generally constantly, or may be performed intermittently at any suitable intervals as desired or required.

Further, in some exemplary embodiments, the processor 90 may be configured to adjust a pitch axis of at least one rotor blade 16, or more than one of the rotor blades 16, of the wind turbine 10 based on the net deflection of the shaft 20. For example, after the net deflection is calculated, the net deflection may be utilized by the processor 90, along with other variables if desired or required, to calculate a generally optimal pitch axis for a rotor blade 16. The processor 90 may then adjust the pitch axis or pitch axes as desired or required. The adjustment of the pitch axes may be performed generally constantly, or may be performed intermittently at any suitable intervals as desired or required.

The present disclosure is further directed to a method for measuring a net deflection of a shaft 20 in a wind turbine 10. The method includes, for example, the steps of measuring at least one first deflection, or a plurality of first deflections, of a first shaft component 60. For example, in some embodiments as discussed above, at least one first sensor 52 or a plurality of first sensors 52 may be positioned proximate the first shaft component 60 to measure the first deflection or first deflections. The method further includes, for example, the steps of measuring at least one reference deflection, or a plurality of reference deflections, which may be a second deflection or second deflections of a second shaft component 70. For example, in some embodiments as discussed above, at least one second sensor 54 or a plurality of second sensors 54 may be positioned proximate the second shaft component 70 to measure the second deflection or second deflections.

The method further includes, for example, calculating the net deflection of the shaft 20 utilizing the first deflection or first deflections and the reference deflection or reference deflections. As discussed above, for example, to calculate the net deflection, the reference deflections may be subtracted from the first deflections or vice-versa, or the reference deflections may be utilized in a transfer function or other suitable equation with the first deflections, or the reference deflections may be otherwise suitably utilized to manipulate the first deflections or vice-versa and output the net deflection. In some embodiments, the net deflection may be calculated utilizing all of the first and reference deflections in one equation. Alternatively, a net deflection may be calculated based on the first and reference deflections for each sensor couple 56, and these net deflections may be averaged or otherwise suitably manipulated to calculate the net deflection of the shaft 20. Calculation of the net deflection may be performed generally constantly, or may be performed intermittently at any suitable intervals as desired or required.

In some embodiments, the method may further include adjusting a pitch axis of at least one rotor blade 16 or a plurality of rotor blades 16 based on the net deflection of the shaft 20. As discussed above, for example, after the net deflection is calculated, the net deflection may be utilized, along with other variables if desired or required, to calculate a generally optimal pitch axis for a rotor blade 16. The pitch axis or pitch axes may then be adjusted as desired or required. The adjustment of the pitch axes may be performed generally constantly, or may be performed intermittently at any suitable intervals as desired or required.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A measurement system for measuring a net deflection of a shaft in a wind turbine, the measurement system comprising:
    at least one first sensor positioned proximate a first shaft component, the at least one first sensor configured to measure at least one first deflection of the first shaft component;
    at least one second sensor positioned proximate a second shaft component, the at least one second sensor configured to measure at least one second deflection of the second shaft component, the second shaft component spaced apart axially from the first shaft component along the shaft;
    a base, wherein the at least one first sensor and the at least one second sensor are coupled together and configured on the base; and,
    a processor configured to calculate the net deflection of the shaft utilizing the at least one first deflection and the at least one second deflection.

2. The measurement system of claim 1, wherein the first shaft component is a hub flange.

3. The measurement system of claim 1, wherein the second shaft component is a disc mounted to the shaft.

4. The measurement system of claim 1, wherein the at least one first sensor and the at least one second sensor are proximity sensors.

5. The measurement system of claim 1, wherein the base is a pillow block assembly.

6. The measurement system of claim 1, further comprising a plurality of first sensors and a plurality of second sensors, each of the plurality of first sensors configured to measure a first deflection and each of the plurality of second sensors configured to measure a second deflection.

7. The measurement system of claim 6, wherein the first shaft component defines a first plane, and wherein each of the plurality of first sensors is configured to measure the first deflection with respect to the first plane.

8. The measurement system of claim 1, wherein the at least one first sensor and the at least one second sensor are positioned substantially circumferentially identically with respect to the shaft.

9. The measurement system of claim 1, wherein the processor is further configured to adjust a pitch axis of at least one rotor blade of the wind turbine based on the net deflection of the shaft.

10. A measurement system for measuring a net deflection of a shaft in a wind turbine, the measurement system comprising:
    a plurality of first sensors positioned proximate a first shaft component and circumferentially spaced about the shaft, the first shaft component defining a first plane, the plurality of first sensors configured to measure a plurality of first deflections of the first shaft component with respect to the first plane;
    a plurality of second sensors positioned proximate a second shaft component and circumferentially spaced about the shaft, the second shaft component defining a second plane, the plurality of second sensors configured to measure a plurality of second deflections of the second shaft component with respect to the second plane, the second shaft component spaced apart axially from the first shaft component along the shaft;
    a base, wherein each of the plurality of second sensors is coupled to one of the plurality of first sensors to form a sensor couple, and wherein each sensor couple is configured on the base; and, a processor configured to calculate the net deflection of the shaft utilizing the plurality of first deflections and the plurality of second deflections.

11. A method for measuring a net deflection of a shaft in a wind turbine, the method comprising:

measuring at least one first deflection of a first shaft component;

measuring at least one second deflection of a second shaft component, the second shaft component spaced apart axially from the first shaft component along the shaft; and, calculating the net deflection of the shaft utilizing the at least one first deflection and the at least one second deflection, wherein the shaft is configured on a base, and wherein the at least one first deflection and the at least one second deflection are both measured relative to the base.

12. The method of claim 11, wherein at least one first sensor is positioned proximate the first shaft component to measure the at least one first deflection and at least one second sensor is positioned proximate the second shaft component to measure the at least one second deflection, and wherein the at least one first sensor and the at least one second sensor are coupled together and configured on the base.

13. The method of claim 12, wherein the at least one first sensor and the at least one second sensor are proximity sensors.

14. The method of claim 11, wherein the first shaft component is a hub flange and the second shaft component is a disc mounted to the shaft.

15. The method of claim 11, further comprising measuring a plurality of first deflections, measuring a plurality of second deflections, and calculating the net deflection of the shaft utilizing the plurality of first deflections and the plurality of second deflections.

16. The method of claim 11, further comprising adjusting a pitch axis of at least one rotor blade of the wind turbine based on the net deflection of the shaft.

17. The method of claim 11, wherein the base is a pillow block assembly.

18. The method of claim 11, wherein the at least one first deflection and the at least one second deflection are measured at substantially circumferentially identical positions with respect to the shaft.

* * * * *